United States Patent
Tran et al.

(10) Patent No.: US 10,984,245 B1
(45) Date of Patent: Apr. 20, 2021

(54) CONVOLUTIONAL NEURAL NETWORK BASED ON GROUPWISE CONVOLUTION FOR EFFICIENT VIDEO ANALYSIS

(71) Applicant: Facebook, Inc., Menlo Park, CA (US)

(72) Inventors: Du Le Hong Tran, Palo Alto, CA (US); Kaiming He, Menlo Park, CA (US); Heng Wang, Mountain View, CA (US); Matthew Dan Feiszli, San Francisco, CA (US); Lorenzo Torresani, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 133 days.

(21) Appl. No.: 16/286,377

(22) Filed: Feb. 26, 2019

Related U.S. Application Data

(60) Provisional application No. 62/683,512, filed on Jun. 11, 2018.

(51) Int. Cl.
*G06K 9/00* (2006.01)
*G06N 3/08* (2006.01)
*G06K 9/62* (2006.01)

(52) U.S. Cl.
CPC ......... *G06K 9/00718* (2013.01); *G06K 9/623* (2013.01); *G06K 9/6229* (2013.01); *G06K 9/6256* (2013.01); *G06N 3/08* (2013.01)

(58) Field of Classification Search
CPC .. G06K 9/00718; G06K 9/6229; G06K 9/623; G06K 9/6256; G06N 3/08
See application file for complete search history.

(56) References Cited

U.S. PATENT DOCUMENTS

| | | | | |
|---|---|---|---|---|
| 9,836,853 B1* | 12/2017 | Medioni | ................. | G06T 7/246 |
| 2017/0032222 A1* | 2/2017 | Sharma | ................ | G06K 9/4619 |
| 2017/0200063 A1* | 7/2017 | Nariyambut Murali | ..................... G06K 9/6227 | |
| 2018/0137406 A1* | 5/2018 | Howard | ................. | G06N 3/082 |
| 2018/0173571 A1* | 6/2018 | Huang | ................ | G06F 13/1678 |
| 2018/0341832 A1* | 11/2018 | Uhlenbrock | .......... | G06K 9/6256 |
| 2019/0215518 A1* | 7/2019 | Alagappan | ........... | H04N 19/139 |
| 2020/0012940 A1* | 1/2020 | Liu | ...................... | H04N 7/0135 |

OTHER PUBLICATIONS

Google Scholar Search Results.*

* cited by examiner

*Primary Examiner* — Qun Shen
(74) *Attorney, Agent, or Firm* — Baker Botts L.L.P.

(57) ABSTRACT

In one embodiment, a method includes receiving a request for information associated with a video, determining the information associated with the video by processing the video using a machine-learning model which is based on a convolutional neural network comprising a plurality of layers, wherein at least one of the plurality of layers comprises one or more building blocks, wherein at least one of the one or more building blocks comprises a first filter configured to perform a three-dimensional (3D) pointwise convolutional operation and a second filter configured to perform a three-dimensional (3D) groupwise convolutional operation, and outputting the information associated with the video in response to the request.

17 Claims, 11 Drawing Sheets

CONVOLUTIONAL NEURAL NETWORK BASED ON GROUPWISE CONVOLUTION FOR EFFICIENT VIDEO ANALYSIS

PRIORITY

This application claims the benefit, under 35 U.S.C. § 119(e), of U.S. Provisional Patent Application No. 62/683,512, filed 11 Jun. 2018, which is incorporated herein by reference.

TECHNICAL FIELD

This disclosure generally relates to video analysis within network environments, and in particular relates to video analysis using machine-learning algorithms within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may perform efficient analysis of videos to determine information associated with them. As an example and not by way of limitation, the analysis of videos may comprise one or more of video classification, video detection, object detection in videos, object classification in videos, or video segmentation. Correspondingly, the information associated with the video may comprise one or more of a category associated with the video, a detection result associated with the video, or a segmentation result associated with the video. In particular embodiments, the analysis may be based on a three-dimensional (3D) convolutional neural network comprising 3D groupwise convolutions. 3D convolutional neural network indicates that the convolutional neural network may be based on a 3D network architecture. Groupwise convolution has recently been introduced and applied in various architectures for image classification. Architectures with groupwise convolution (e.g., Xception, MobileNet, ShuffleNet, ResNeXt) have shown their advantage in reducing the computational cost compared with conventional convolutional networks. These families of architectures provide different computation/accuracy trade-offs in image classification, e.g., MobileNet and ShuffleNet are computationally more efficient whereas Xception and ResNeXt can provide higher accuracy. In the video domain, the state-of-the-art video classification models, such as I3D and R(2+1)D, are often computationally expensive due to the widely use of 3D convolutional layers on large tensors. It is thus natural to ask: 1) Is 3D groupwise convolution useful for reducing the computational cost of video models? 2) When shifting from the image to the video domain, can the trade-offs among different groupwise convolutional architectures still hold? and 3) If the trade-offs are different from image to video, what are the best practices of applying 3D groupwise convolution to video classification? The embodiments disclosed herein extend the family of image models based on groupwise convolution to 3D and compare them on a common ground of video classification. Experiments are designed to empirically answer the aforementioned questions and to provide insights for designing video classification models. The ablation study leads to a new state-of-the-art video classification architecture based on ResNeXt, namely ResNeXt-3D. ResNeXt-3D outperforms or is on a par with the state-of-the art method on public datasets including Kinetics, Sports1M, Something-Something, UCF101, and HMDB51 while being 2 to 3 times faster than I3D and R(2+1)D. Although this disclosure describes particular machine-learning models for particular video analysis in particular manners, this disclosure contemplates any suitable machine-learning model for any suitable video analysis in any suitable manner.

In particular embodiments, the social-networking system may receive a request for information associated with a video. The social-networking system may then determine, by processing the video using a machine-learning model, the information associated with the video. In particular embodiments, the machine-learning model may be based on a convolutional neural network comprising a plurality of layers. At least one of the plurality of layers may comprise one or more building blocks. In particular embodiments, at least one of the one or more building blocks may comprise a first filter configured to perform a three-dimensional (3D) pointwise convolutional operation and a second filter configured to perform a three-dimensional (3D) groupwise convolutional operation. In particular embodiments, the social-networking system may further output, in response to the request, the information associated with the video.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
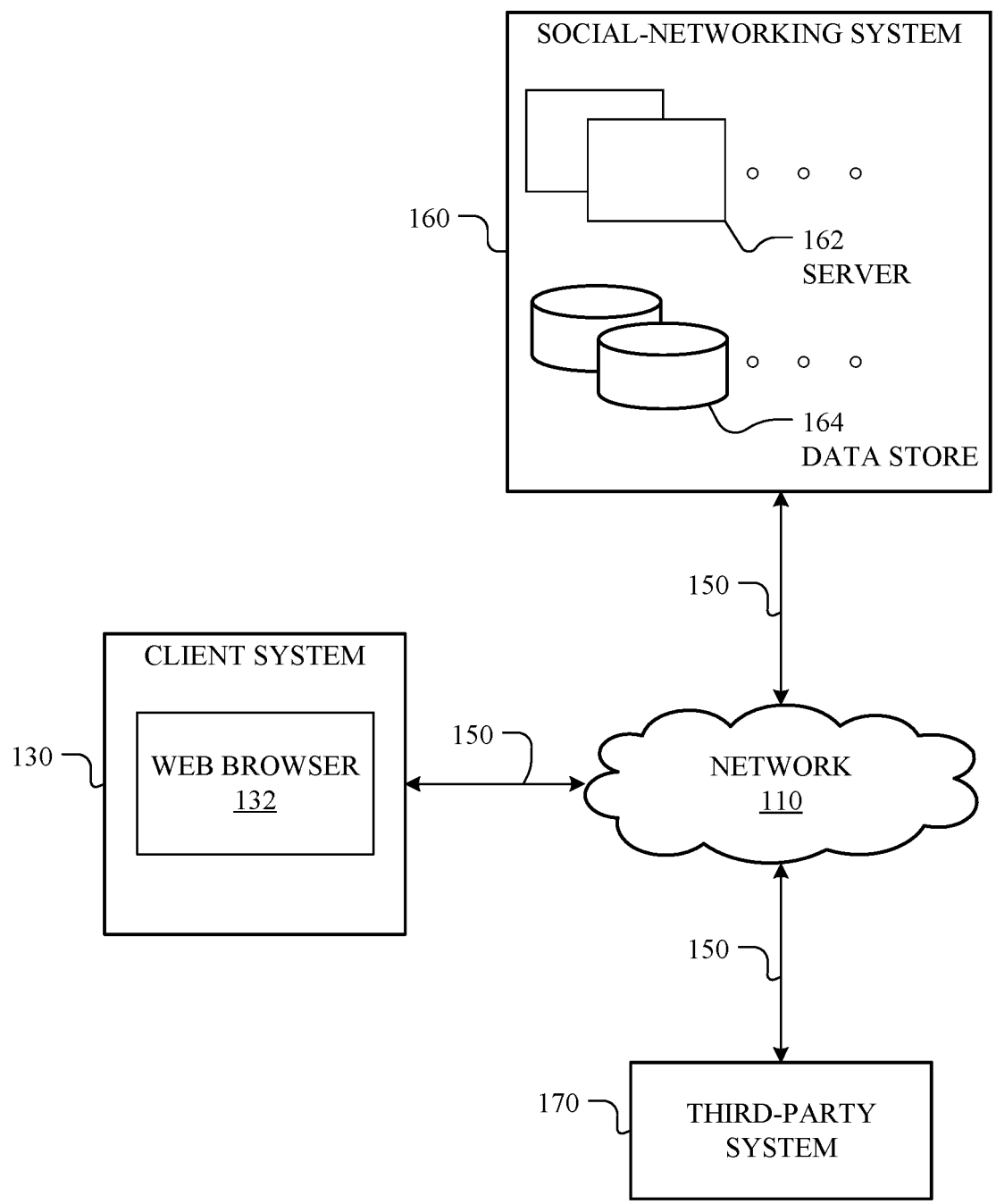
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, the social-networking system 160 may perform efficient analysis of videos to determine information associated with them. As an example and not by way of limitation, the analysis of videos may comprise one or more of video classification, video detection, object detection in videos, object classification in videos, or video segmentation. Correspondingly, the information associated with the video may comprise one or more of a category associated with the video, a detection result associated with the video, or a segmentation result associated with the video. In particular embodiments, the analysis may be based on a three-dimensional (3D) convolutional neural network comprising 3D groupwise convolutions. 3D convolutional neural network indicates that the convolutional neural network may be based on a 3D network architecture. Groupwise convolution has recently been introduced and applied in various architectures for image classification. Architectures with groupwise convolution (e.g., Xception, MobileNet, ShuffleNet, ResNeXt) have shown their advantage in reducing the computational cost compared with conventional convolutional networks. These families of architectures provide different computation/accuracy trade-offs in image classification, e.g., MobileNet and ShuffleNet are computationally more efficient whereas Xception and ResNeXt can provide higher accuracy. In the video domain, the state-of-the-art video classification models, such as I3D and R(2+1)D, are often computationally expensive due to the widely use of 3D convolutional layers on large tensors. It is thus natural to ask: 1) Is 3D groupwise convolution useful for reducing the computational cost of video models? 2) When shifting from the image to the video domain, can the trade-offs among different groupwise convolutional architectures still hold? and 3) If the trade-offs are different from image to video, what are the best practices of applying 3D groupwise convolution to video classification? The embodiments disclosed herein extend the family of image models based on groupwise convolution to 3D and compare them on a common ground of video classification. Experiments are designed to empirically answer the aforementioned questions and to provide insights for designing video classification models. The ablation study leads to a new state-of-the-art video classification architecture based on ResNeXt, namely ResNeXt-3D. ResNeXt-3D outperforms or is on a par with the state-of-the art method on public datasets including Kinetics, Sports1M, Something-Something, UCF101, and HMDB51 while being 2 to 3 times faster than I3D and R(2+1)D. Although this disclosure describes particular machine-learning models for particular video analysis in particular manners, this disclosure contemplates any suitable machine-learning model for any suitable video analysis in any suitable manner.

In particular embodiments, the social-networking system 160 may receive a request for information associated with a video. The social-networking system 160 may then determine, by processing the video using a machine-learning model, the information associated with the video. In particular embodiments, the machine-learning model may be based on a convolutional neural network comprising a plurality of layers. At least one of the plurality of layers may comprise one or more building blocks. In particular embodiments, at least one of the one or more building blocks may comprise a first filter configured to perform a three-dimensional (3D) pointwise convolutional operation and a second filter configured to perform a three-dimensional (3D) groupwise convolutional operation. In particular embodiments, the social-networking system 160 may further output, in response to the request, the information associated with the video.

Temporal convolution has been proven to be an effective way of modeling sequential signals and become increasingly popular recently [1-3]. In video classification, convolution along the temporal dimension (e.g., 3D convolution [4, 5]) is a fundamental building block for spatial-temporal neural networks. In contrast to recurrent neural networks (e.g., LSTM [6]), 3D convolution can naturally be extended from spatial to spatial-temporal domain, and thus is often easier to implement and train, and achieve the state of the art performance on various video datasets. On the downside, 3D convolution tends to be more computationally expensive due to the convolution in high dimensional spaces.

Recently, groupwise convolution [8, 7, 9-11] is proposed as a new building block to achieve better computation/accuracy trade-offs in image classification. When applying to each channel separately, groupwise convolution becomes depthwise convolution [7], or channelwise convolution to be more exact. It breaks down the convolution into smaller groups in the channel dimension and limits the convolution to be within each group. This significantly reduces the cost of 2D convolution by omitting the convolution across different groups. It is thus appealing to apply groupwise convolution when designing video architectures as the computational burden is more severe for video. In particular embodiments, the video may be associated with one or more channels. Accordingly, the 3D groupwise convolutional operation may be associated with a process comprising determining one or more groups for the one or more channels and applying a convolutional operation to each of the one or more groups separately. Each group may comprise one or more of the one or more channels.

Although extending 2D groupwise architectures into 3D is straightforward, it is unclear what are good computation/accuracy trade-offs for those families of architectures. Since the complexity of a 3×3 kernel can be increased from $O(3^2)$ to $O(3^3)$ when extending from 2D to 3D, and its relative computation comparing with a 1×1 kernel (e.g., which remains the same from $O(1^2)$ to $O(1^3)$) can be substantially different. As a result, grouping these layers in various types of blocks may introduce different trade-offs between the case of 2D and 3D. Moreover, some technical designs made in image classification may no longer be optimal for applications such as video classification. It is believed this is an important open question to answer in order to understand better about the good practices for video architecture design. The embodiments disclosed herein empirically study the trade-offs of the groupwise convolution-based architectures in the problem of video classification.

The embodiments disclosed herein provide a comprehensive study on how to apply groupwise convolution to designing better architectures for video classification. The following sets of experiments are conducted in order to collect enough evidences to draw conclusions from:

Standard 3D convolution vs. 3D groupwise convolution. The experiments start with ResNet-3D [12] and I3D [5], which are popular video models based on standard 3D convolution. Then the experiments switch to 3D groupwise convolution for both models and the model capacity is increased by stacking more layers to better understand the behavior of 3D groupwise convolution.

A thorough comparison of different groupwise convolutional architectures for video classification. The state-of-the-art groupwise convolution-based image architectures (e.g., ResNeXt, Xception, and ShuffleNet) are extended from 2D to 3D, and an in-depth analysis about the computation/accuracy trade-off of these architectures in a common setting is provided.

Important architecture choices when using 3D groupwise convolution. The experiments delve deep into model depth (number of layers), model width (number of channels) for both standard convolutional layers and bottleneck layers, and how to split the computational budget between these two types of layers.

Note that the above three sets of experiments are conducted to address (if not fully) the three questions: 1) Is 3D groupwise convolution useful for reducing the computational cost of video models? 2) When shifting from the image to the video domain, can the trade-offs among different groupwise convolutional architectures still hold? and 3) If the trade-offs are different from image to video, what are the best practices of applying 3D groupwise convolution to video classification? The embodiments disclosed herein may provide guidelines to better use of 3D groupwise convolution in video classification and inspire new architecture designs in the video domain.

Groupwise convolution. Groupwise convolution (also called depthwise or separable convolution) was introduced in MobileNet [9] (if not earlier) as an attempt to optimize model size and computational cost for mobile applications. Chollet [7] built an extreme version of Inception [13] based on 2D depthwsie convolution, named Xception, where the Inception block was redesigned to include multiple separable convolutions. Concurrently, Xie et al. proposed ResNeXt [8], which arms the prevailing ResNet [14] architecture with groupwise convolution. Further architecture improvements have also been made for mobile applications. ShuffleNet [11] reduced the computational cost of the bottleneck layers with pointwise group convolution and used average pooling instead of convolution for shortcut projections in ResNet [14]. These have been shown to significantly reduce the amount of computation (number of FLOPs) and the size of the model (number of parameters). MobileNetV2 [10] improved MobileNet [9] by switching from a VGG-style to a ResNet-style network and introducing a "reverted bottleneck" block. Although these recent works provide many insights about how to design efficient networks, it is still unclear which one works the best given all the bells and whistles used under different scenarios. Moreover, the conclusions from applying groupwise convolution in image classification may no longer hold due to the additional complexity and challenges imposed by video classification.

Action recognition. Action recognition has shifted from hand-crafted features [15-19]) to deep network-based approaches [4, 20-25]). Recently, Carreira and Zisserman [5] proposed I3D to inflate 2D ConvNet pre-trained on ImageNet [26] to 3D and achieved the state-of-the-art results on video classification. Wang et al. [27] proposed non-local neural networks to capture long-range dependencies in video data. ARTNet [28] decoupled spatial and temporal modeling into two parallel branches. Similarly, 3D convolutions can also be decomposed into a Pseudo-3D convolutional block as in P3D [29] or factorized convolution as in R(2+1)D [12]. S3D [30] improved I3D to reduce the computational cost by replacing 3D convolutions with spatiotemporal-separable 3D convolutions. The embodiments disclosed herein are along this research direction which aim at designing better CNN architectures to improve the accuracy of video classification and achieve good practical computation/accuracy trade-offs.

Empirical evaluation. An empirical evaluation is often very useful to compare different algorithms and provide guidelines to solve problems in practice. Here a few recent examples from different areas are listed. Chatfield et al. [31] first compared different hand-crafted feature encoding methods for visual recognition, and later extended them to include deep learning-based representations [32]. Wang et al. [33] evaluated different local spatiotemporal features for video classification. In the language modeling domain, an empirical evaluation [34] was conducted to explore various RNN architectures. Greff et al. [35] also compared different LSTM architectures on applications such as speech recognition, handwriting recognition, and music modeling. Huang et al. [36] investigated the speed/accuracy trade-offs for recent convolutional object detectors. Given all the recent architectures based on groupwise convolution, a systematic evaluation under the same experimental setup is important to better understand the properties of groupwise convolution and drive its application in new areas such as video classification.

In particular embodiments, the 3D groupwise convolutional operation may comprise a 3D depthwise convolutional operation. This following briefly describes the experimental setup used in the ablation experiments which are designed to gain some insights about 3D depthwise convolution and families of architectures using this type of convolution. Although groupwise convolution is also used in some architectures (e.g. ShuffleNet), one focus in the embodiments disclosed herein is to understand 3D depthwise convolution because its computational advantage. The same setup is used in all the experiments unless stated otherwise. In particular embodiments, the 3D depthwise convolutional operation may be associated with one or more input channels and one or more output channels. In addition, a number of the one or more input channels may equal a number of the one or more output channels. In particular embodiments, the 3D depthwise convolutional operation may be associated with a process comprising determining one or more groups for the one or more channels and applying a convolutional operation to each of the one or more groups separately. Each group may comprise one channel of the one or more channels.

Dataset. In particular embodiments, training the machine-learning model may be based on a plurality of training videos. The Kinetics400 dataset [37] is chosen as the major test bed to explore groupwise convolution for video classification. Kinetics is a large-scale video dataset which enables training deep models from scratch. It has 400 action categories. The training set (about 240K videos) is used for training and the accuracy on the validation set (about 20K videos) is reported. Note that, Kinetics-400 is used for the ablation experiments in order to gain a better understanding about different families of architectures. The best architectures in the embodiments disclosed herein are later evaluated and compared with state-of-the-art methods on Sports1M, Kinetics-600, Something-Something, UCF101, and HMDB51.

Notations. For simplicity, the kernel size, padding, striding parameter are represented by T×H×W in the order of time, height, and width. This order is applied the same for kernel size, padding, striding parameters for convolution and pooling layers.

Training and evaluation. Video frames are scaled to the size of 128×171 and each clip is generated by randomly cropping windows of size 112×112. L=8 consecutive frames are randomly sampled from the video with temporal jittering during training. The final input to the model is a video clip of size 3×8×112×112, where 3 corresponds to the R, G, B channels. A mini-batch size of 32 clips per GPU is used. For deeper models or longer clip input, the mini-batch size is reduced due to the limit of GPU memory and the learning rate is adjusted accordingly. Although Kinetics has only about 240 k training videos, the epoch size is set to be 1M because temporal jittering may generate more training clips than the actual number of videos. The initial learning rate is set to 0.01 and divided by 10 every 10 epochs. The first 10 epochs are used for warm-up [38] in the distributed training disclosed herein. Training is done in 45 epochs. Both clip level accuracy and video level accuracy are reported. 10 center-cropped clips are used uniformly sampled in time from the whole video and average these 10 clip predictions to obtain the video level accuracy. Training is done with synchronous distributed SGD on GPU clusters using caffe2 [39].

Figure 2B:
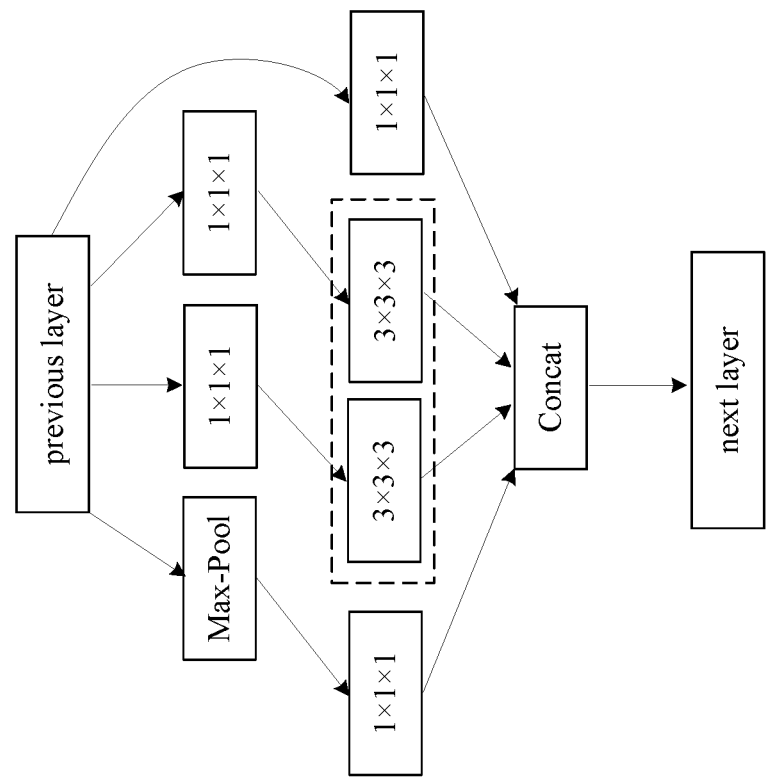
FIG. 2B illustrates an example ablative change of I3D architecture.
Figure 2A:
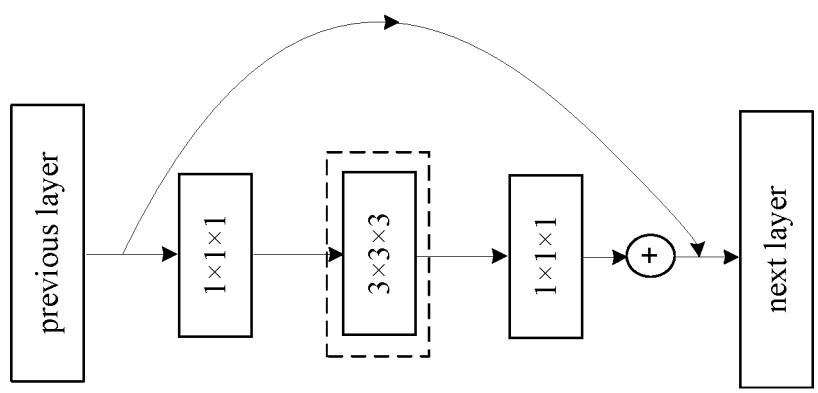
FIG. 2A illustrates an example ablative change of R3D architecture.

FIGS. 2A-2B illustrates example ablative changes of R3D and I3D architectures. The following experiment is designed to understand the trade-off of 3D depthwise convolution compared to standard 3D convolution. R3D [12] (aka. ResNet-3D) and I3D [5] are chosen as reference models and then 3D convolution filters in these models are replaced with 3D depthwise convolution. As illustrated previously, a first filter may be configured to perform a 3D pointwise convolutional operation and a second filter may be configured to perform a 3D groupwise convolutional operation. In particular embodiments, the first filter may be associated with an output from the first filter. The second filter may be associated with an input to the second filter. In particular embodiments, the input to the second filter may comprise the output from the first filter. Different from standard convolution, depthwise convolution requires input and output channels have to be the same. To satisfy this constraint, the embodiments disclosed herein experiment with R3D with only bottleneck block where the 3×3×3 3D convolution has the same input and output channels. For I3D, the number of output channels of the 1×1×1 pointwise convolution before the 3×3×3 3D convolution is purposely increased to match the output channels of the 3×3×3 convolution. FIG. 2A illustrates an example ablative change of R3D architecture. To vary the model depth, for R3D the standard block configurations of ResNet-50 and ResNet-26 (e.g., ResNet-18 with bottleneck instead of simple block) are used. FIG. 2B illustrates an example ablative change of I3D architecture. For I3D, each inception block is repeated k times to make I3D deeper. As an example and not by way of limitation, the default I3D with k=1 may have 22 layers.

TABLE 1

Standard 3D convolution v.s. 3D depthwise convolution.

| Model | depth | clip @ 1 (%) | video @ 1 (%) | video @ 5 (%) | FLOPS ×10⁹ | parameters ×10⁶ |
|---|---|---|---|---|---|---|
| I3D | 22 | 45.6 | 57.8 | 79.9 | 3.1 | 12.7 |
| I3D | 40 | 45.5 | 57.8 | 80.4 | 4.4 | 25 |
| R3D | 26 | 50.6 | 62.7 | 83.6 | 12.2 | 20.4 |
| R3D | 50 | 55.1 | 67 | 86.3 | 27.3 | 46.9 |
| I3D-dw | 22 | 44.2 | 56.3 | 78.2 | 2.1 | 4.1 |
| I3D-dw | 40 | 45.4 | 57.5 | 80 | 2.4 | 8 |
| R3D-dw | 26 | 49.1 | 61 | 82.8 | 1.9 | 1.7 |
| R3D-dw | 50 | 54.4 | 66.7 | 85.6 | 8.5 | 13.1 |

Table 1 presents the results of these architecture variations on Kinetics validation set. 3D depthwise convolution yields small accuracy drop while being smaller and faster in both R3D and I3D. To be more specific, replacing 3D standard convolution with depthwise ones results in video top-1 accuracy dropped by 1.5%, 0.3%, 1.7%, and 0.3% for I3D-22, I3D-40, R3D-26, and R3D-50, respectively. At the same time, this replacement makes these models 1.5-6× faster and 3-10× smaller. This result indicates that 3D depthwise convolution provides a better computation/accuracy trade-off compared with standard 3D convolution for video classification.

The promising computation/accuracy trade-off when using 3D depthwise convolution instead of standard convolution has been observed. The next question the embodiments disclosed herein would like to answer is "given that 3D depthwise convolution has a good computation/accuracy trade-off, which type of architectures will get the most benefit from it?" More specifically, the embodiments disclosed herein would like to understand "where (in which type of architectures) 3D depthwise convolution will give its best computation/accuracy trade-off for video classification?" Since most of current architectures use 2D depthwise convolution for image classification, the embodiments disclosed herein extend these 2D depthwise convolution-based architectures into 3D and evaluate them on the action recognition task. These architectures are then varied by going deeper (increasing the number of layers) or wider (increasing the number of filters) and are evaluated on action recognition in order to understand the computation/accuracy trade-off of these models. Architectures to be evaluated in this ablation experiment are first presented together with some non-depthwise baseline architectures and next the experimental results of these networks with varying depth or width are reported.

ResNet-3D This is a standard baseline for video classification. The main architecture is ResNet [14] with 3D convolution and pooling. It can be applied on either basic or simple block or bottleneck block. The embodiments disclosed herein use a similar setting as used in [12] where only spatial downsampling (striding 1×2×2) is applied at conv1 and spatiotemporal downsampling (striding 2×2×2) is applied at the first block of group 3, 4, and 5 (e.g., conv3_1, conv4_1, and conv5_1). No max pooling is used after conv1.

ResNet-(2+1)D. R(2+1)D is one of the state-of-the-art architectures for action recognition in videos [12]. This architecture is equivalent to ResNet-3D baseline, mentioned above, except for all 3D convolutions are replaced by (2+1)D-factorized convolutions. Similar to ResNet-3D, this class of architecture can also be applied on either simple- or bottleneck blocks with (2+1)D convolution.

TABLE 2

ResNeXt3D and ShuffleNet3D architectures.

| layer name | output size | ResNeXt3D-D50 | ShuffleNet3D-D50 |
|---|---|---|---|
| conv1 | T × 56 × 56 | 3 × 7 × 7, 64, stride 1 × 2 × 2 | |
| conv2_x | T × 56 × 56 | $\begin{pmatrix} 1\times1\times1, 256 \\ DW3\times3\times3, 64 \\ 1\times1\times1, 256 \end{pmatrix} \times 3$ | $\begin{pmatrix} GConv1\times1\times1, 256 \\ DW3\times3\times3, 64 \\ GConv1\times1\times1, 256 \end{pmatrix} \times 3$ |
| conv3_x | $\frac{T}{2} \times 28 \times 28$ | $\begin{pmatrix} 1\times1\times1, 512 \\ DW3\times3\times3, 128 \\ 1\times1\times1, 512 \end{pmatrix} \times 4$ | $\begin{pmatrix} GConv1\times1\times1, 512 \\ DW3\times3\times3, 128 \\ GConv1\times1\times1, 512 \end{pmatrix} \times 4$ |
| conv4_x | $\frac{T}{4} \times 14 \times 14$ | $\begin{pmatrix} 1\times1\times1, 1024 \\ DW3\times3\times3, 256 \\ 1\times1\times1, 1024 \end{pmatrix} \times 6$ | $\begin{pmatrix} GConv1\times1\times1, 1024 \\ DW3\times3\times3, 256 \\ GConv1\times1\times1, 1024 \end{pmatrix} \times 6$ |
| conv5_x | $\frac{T}{8} \times 7 \times 7$ | $\begin{pmatrix} 1\times1\times1, 2048 \\ DW3\times3\times3, 512 \\ 1\times1\times1, 2048 \end{pmatrix} \times 3$ | $\begin{pmatrix} GConv1\times1\times1, 2048 \\ DW3\times3\times3, 512 \\ GConv1\times1\times1, 2048 \end{pmatrix} \times 3$ |
| | 1 × 1 × 1 | spatiotemporal average pooling, fc layer with softmax | |

In Table 2, convolutional residual blocks are shown in brackets, next to the number of times each block is repeated in the stack. The dimensions given for filters and outputs are time, height, and width, in this order. Downsampling is performed at conv1 with a striding of 1×2×2 and at conv3_1, conv4_1, and conv5_1 with a striding of 2×2×2. The series of convolutions culminates with a global spatiotemporal pooling layer that yields a 512- or 2048-dimensional feature vector. This vector is fed to a fully-connected layer that outputs the class probabilities through a softmax. DW and GConv denote depthwise and groupwise convolutions.

Figure 3C:
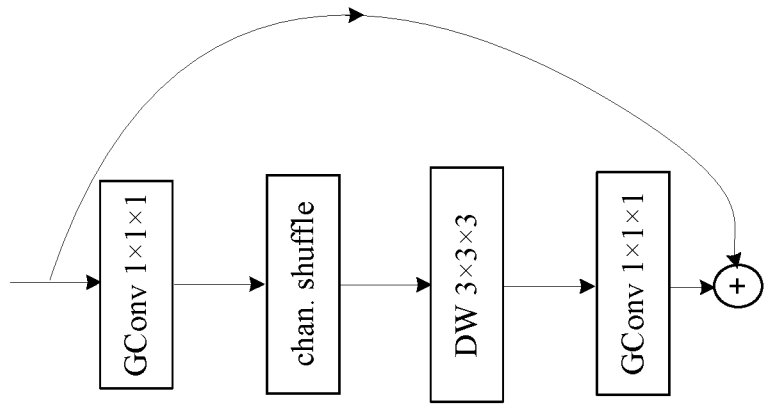
FIG. 3C illustrates an example extension of the ShuffleNet model into its 3D version.
Figure 3B:
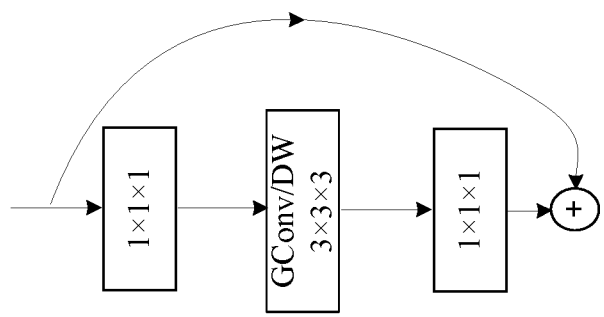
FIG. 3B illustrates an example extension of the ResNeXt model into its 3D version.
Figure 3A:
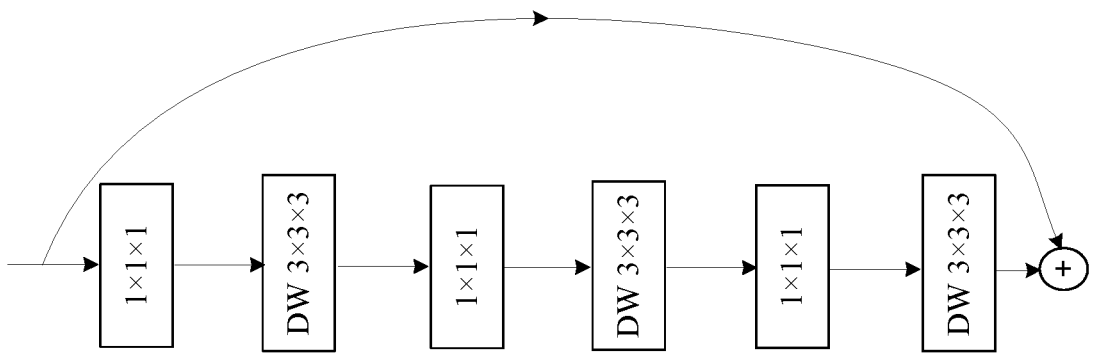
FIG. 3A illustrates an example extension of the Xception model into its 3D version.

Xception-3D. FIG. 3A illustrates an example extension of the Xception model into its 3D version. Xception is one of state-of-the-art architectures for image classification [7]. It is proven to have a good trade-off of accuracy/computation because of its usage of depthwise convolution. The embodiments disclosed herein extend Xception model into 3D with a few modifications. In particular embodiments, the convolutional neural network of the machine-learning model may be based on Xception. In particular embodiments, the convolutional neural network may further comprise a plurality of paddings, kernels, and stridings. First, all 3×3 convolutions are extended into 3×3×3 with padding 1×1×1. And all 2D max pooling are also made into 3D with 3×3×3 kernel and with 2×2×2 striding. FIG. 3A shows an example middle block of the Xception model extended into 3D. The 2D Xception model has 5 times of spatial downsampling of 2×2 at conv1, and at three blocks of the entry flow, and then at the first block of the exit flow. In the extension, the first two downsampling are performed with a striding of 1×2×2 (only spatial downsampling) and the last three downsampling are performed with a striding of 2×2×2 (spatiotemporal downsampling).

ResNeXt-3D. FIG. 3B illustrates an example extension of the ResNeXt model into its 3D version. ResNeXt is one of the state-of-the-art architectures for image classification [8]. It is a ResNet-style architecture with bottleneck blocks. The embodiments disclosed herein extend ResNeXt into 3D with a bottleneck block consisting of 1×1×1 convolution and one group- or depthwise 3×3×3 convolution in between (as shown in FIG. 3B). The embodiments disclosed herein use ResNeXt-3D with the extreme case of 3×3×3 depthwise convolutions in all the experiments.

ShuffleNet-3D. FIG. 3C illustrates an example extension of the ShuffleNet model into its 3D version. ShuffleNet [11] is classified into ResNet-style architecture with bottleneck blocks. The embodiments disclosed herein extend this architecture into 3D with the 3D ShuffleNet bottleneck block which is shown in FIG. 3C. Different from the original 2D ShuffleNet, the embodiments disclosed herein use 5 convolution groups instead of 4 as there is no memory constraint. The embodiments disclosed herein use the same downsampling schedule as in ResNet-3D and ResNet-(2+1)D. It is noted that the bottleneck block of ShuffleNet contains a 3D depthwise convolution of 3×3×3 and two groupwise convolutions of 1×1×1. The embodiments disclosed herein use the number of blocks and filters as the same as the standard settings used in 2D ResNets while ShuffleNet has different block and filter settings, e.g., 4 convolution groups instead of 5. For the downsampling blocks, the embodiments disclosed herein also use average pooling and concatenation as used in [11], but it is omitted in FIG. 3C for simplicity. The embodiments disclosed herein use the group number of 8 for all 1×1×1 group convolutions as that was reported to be the best trade-off in image classification. It is noted that the difference between ShuffleNet-3D and ResNeXt-3D are the group convolution and 1×1×1 layers and the average pooling instead of 1×1×1 convolution for projection layers. If the average pooling vs. convolution at projection layers are ignored, the difference between these two architecture is only one hyper-parameter, e.g., the number of groups used at 1×1×1 which is 1 for ResNeXt (conventional pointwise convolution) and greater than 1 (e.g., 8 groupwise convolutions) for ShuffleNet.

To understand the computation/accuracy trade-offs of these families of architectures, the embodiments disclosed herein vary the network depth (number of layers) and width (number of filters/channels) of these architectures so that their performance (accuracy) change when their computation (FLOPs) are increasing due to having more layers or more filters may be observed.

Deeper networks. For ResNet-style architectures the embodiments disclosed herein experiment with networks of 18, 26, 34, 50, 101, and 152 layers. In these settings, 18- and 34-layer networks are based on simple blocks, the rest are based on bottleneck blocks. It is noted there is one special case, ResNet-26, which is similar to ResNet-18, but replaced simple blocks with bottleneck ones (they both have the same number of blocks across the five convolution groups). For Xception-3D model, the embodiments disclosed herein vary the depth by changing the number of middle blocks to 4, 8, 12, and 16 blocks which are equivalent to Xception-3D model with 25, 37, 49, and 61 layers, respectively. It is worth noting that a separable convolution block (a 1×1×1 convolution followed by a depthwise 3×3×3 convolution) in Xception-3D and a (2+1)-D factorized convolution in ResNet-(2+1)D is counted as one layer.

Figure 4A:
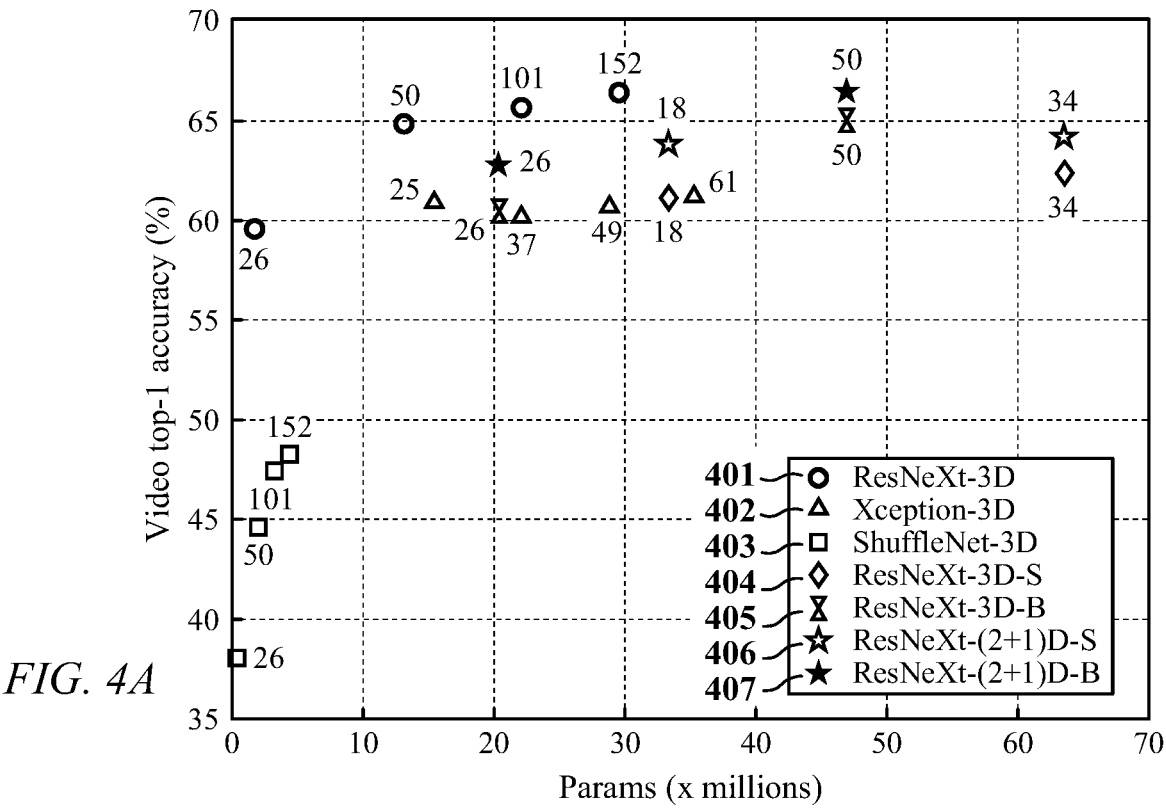
FIG. 4A illustrates example video top-1 accuracy w.r.t. the model size (in terms of number of parameters) on Kinetics validation set of different classes of architectures when their depth is varied.
Figure 4B:
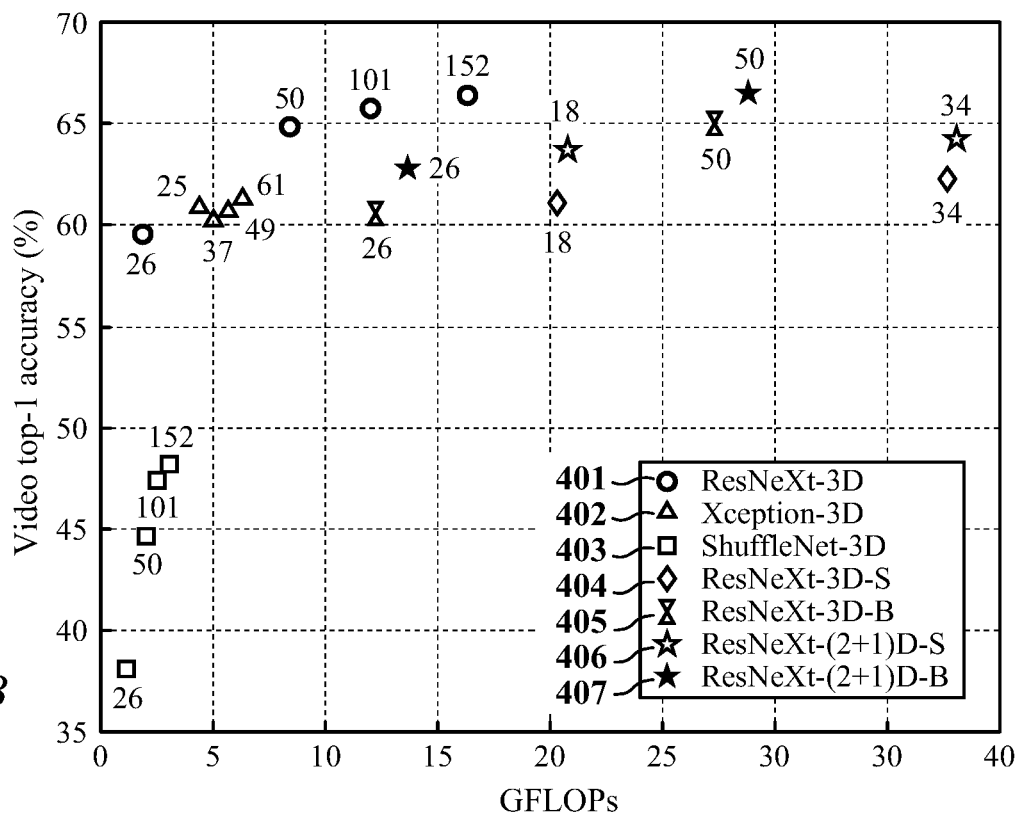
FIG. 4B illustrates example video top-1 accuracy w.r.t. the model complexity (in terms of FLOPs) on Kinetics validation set of different classes of architectures when their depth is varied.

FIGS. 4A-4B illustrate example video top-1 accuracy on Kinetics validation set of different classes of architectures when their depth is varied. FIG. 4A illustrates example video top-1 accuracy w.r.t. the model size (in terms of number of parameters) on Kinetics validation set of different classes of architectures when their depth is varied. FIG. 4B illustrates example video top-1 accuracy w.r.t. the model complexity (in terms of FLOPs) on Kinetics validation set of different classes of architectures when their depth is varied.

There are a couple of interesting observations may be made. Most of ResNet-style architectures are benefited from going deeper. For Xception-3D, it is very FLOPs-efficient when going deeper, however, there is no noticeable gain in accuracy. ShuffleNet-3D, by design is efficient both in terms of model size and complexity. However, with a similar number of parameters and FLOPs, ResNeXt-3D is about 11.3% and 12.1% better than ShuffleNet-3D with 152 and 101 layers, respectively. This observation may indicate that ResNeXt block gives the best trade-off between accuracy and complexity. As it can be seen, if the 1×1×1 convolution in ResNeXt-3D is further made groupwise (as in ShuffleNet-3D) the accuracy is significantly dropped. It is noted that, in image classification, ShuffleNet has been shown to be a good trade-off for computation, this is no longer true when it comes to video classification.

On the accuracy axis, ResNeXt-3D with 101 and 152 layers are on par (slightly better than) with the state-of-the-art ResNet-(2+1)D with 34 and 50 layers, but with 3× smaller in terms of FLOPs and 2.9× smaller in terms of number of parameters. On architecture-wise comparison, one can regard ResNext-3D as factorizing the 3D convolution between channel dimension and then spatiotemporal dimensions, while ResNet-(2+1)D as factorizing 3D convolution between spatial and temporal dimension. These two factorizations give about the same accuracy while the channel-wise factorization is more FLOPs- and parameter-saving. This is understandable as "channel kernel size" (e.g., the number of input channels) are normally at the order of hundreds or thousands while spatial or temporal kernel size is normally as small as 3. The embodiments disclosed herein also applied both factorizations, e.g., ResNeXt-(2+1)D, the obtaining accuracy is about the same while FLOPs is slightly increased, and the required memory for training is much higher because of using more layers and thus more activations needed to be stored.

Some other observations on ResNet-3D and ResNet-(2+1)D may include: 1) ResNet-(2+1)D consistently outperforms ResNet-3D in all depth despite they have the same number of parameters (consistent with [12]); and 2) For both ResNet-3D and ResNet-(2+1)D, replacing simple blocks with bottleneck blocks (18 layers→26 layers or 34 layers→50 layers) results in reduced number of FLOPs. It is noted that bottleneck and simple blocks were designed to have a similar FLOPs in the 2D case, however, this condition may no longer hold for 3D case. Thus, this confirms that some model trade-off which have been observed in image classification not necessarily remain the same for video classification.

Finally, it is believed that a fair model architecture comparison should not rely only on a single data point, but also on a curve rendered by these families of architectures. Arguably, one can push accuracy as high as possible when consuming a lot more FLOPs. This is well-known in computer vision when many models/crops predictions are ensembled. It may be observed from FIG. 4B that the ResNeXt-3D architectures (curve made by blue circles) is the highest, followed by Xception-3D (red triangle curve), and then ShuffleNet-3D (green square curve).

Figure 5A:
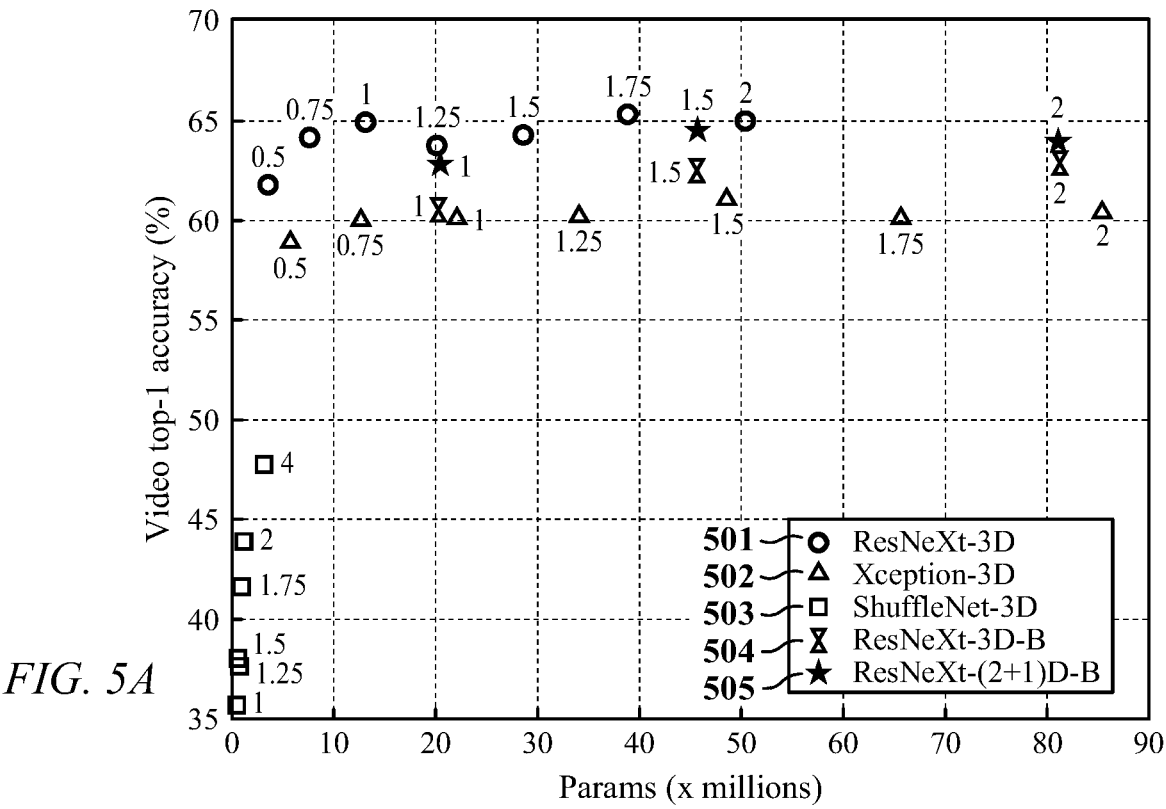
FIG. 5A illustrates example video top-1 accuracy w.r.t. the model size (in terms of number of parameters) on Kinetics validation set of different classes of architectures when their width is varied.
Figure 5B:
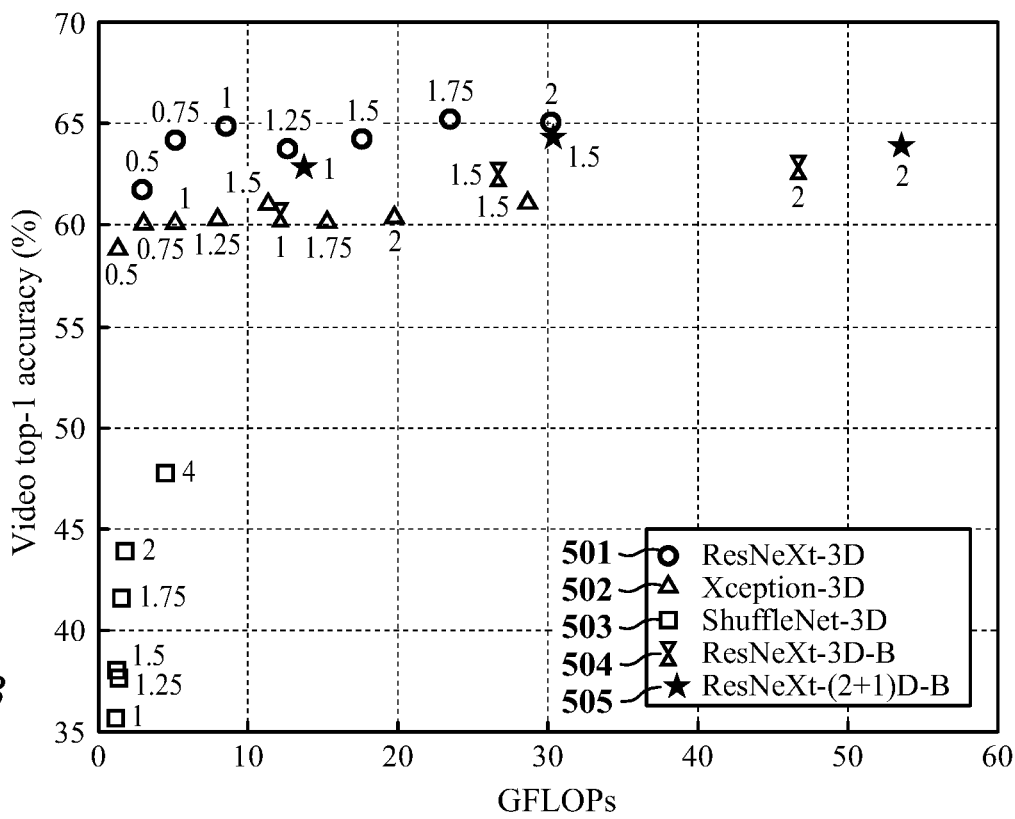
FIG. 5B illustrates example video top-1 accuracy w.r.t. the model complexity (in terms of FLOPs) on Kinetics validation set of different classes of architectures when their width is varied.

Wider networks. The networks convolution layer channels are uniformly multiplied by different multipliers, e.g., {0.5, 0.75, 1, 1.25, 1.5, 1.75, 2, 4}, which results in networks with the same depth but different width. ResNet-3D, ResNet-(2+1) D, and ShuffleNet-3D with 26 layers, Xception-3D with 37 layers, and ResNeXt-3D with 50 layers are used as the reference points for each class of model, then their width with different width multiplier factors is varied. FIGS. 5A-5B illustrate example top-1 accuracy on Kinetics validation set of different architectures when their width is varied. FIG. 5A illustrates example video top-1 accuracy w.r.t. the model size (in terms of number of parameters) on Kinetics validation set of different classes of architectures when their width is varied. FIG. 5B illustrates example video top-1 accuracy w.r.t. the model complexity (in terms of FLOPs) on Kinetics validation set of different classes of architectures when their width is varied. The main observation is that increasing network width may be not very beneficial for high-capacity networks (e.g., ResNet-3D, ResNet-(2+1)D, Xception-3D, and ResNeXt-3D) while it may be still helpful for small network, such as ShuffleNet-3D. Another observation is that going deeper may be more effective than going wider across all of these families of architectures and naively/uniformly widening the networks seems not to be a good design option.

In particular embodiments, the request for information associated with a video may be associated with a requirement of a trade-off between accuracy and computational cost. As previously discussed and confirmed, some computation/accuracy trade-offs in image classification may no longer hold for video classification. In addition, the experiments also revealed that naively widening networks may not be a good design choice. In this ablation experiment an analysis on FLOPs distribution over different convolution types (e.g., pointwise 1×1 v. s. depthwise 3×3 conv) and how it affects the model accuracy are further provided. Since the computation ratio between 3×3 over 1×1 is significantly changed when shifting from image to video domain, a careful evaluation on this aspect may be helpful to understand the best practice for designing video architecture.

In particular embodiments, the social-networking system 160 may determine a number of the plurality of layers based on the requirement of the trade-off between accuracy and computational cost. For this experiment, ResNeXt-3D with 50 layers is chosen as a reference model (as it is previously shown to have the best trade-off), the number of filters is then adjusted to vary the FLOPs distribution of different convolution types. In order to have a fair and direct comparison, these variants are also constrained to have a similar FLOPs with the reference model. These models are trained on Kinetics training set and evaluated on the validation set.

Varying the FLOPs distribution over different convolution types. In particular embodiments, the at least one building block may comprise a plurality of first filters and a plurality of second filters. Since ResNeXt is a ResNet-style architecture with bottleneck blocks, let N and M denote the number of filters of 1×1×1 convolution and 3×3×3 depthwise convolution in the group of conv2_x layers (see Table 2, e.g., M=64 and N=256), respectively. The numbers of filters will be 2N and 2M for conv3×group, 4N and 4M for conv4×group, and 8N and 8M for conv5×group, respectively. It is noted that M and N are by default set to 64 and 256 for the reference model of ResNeXt-50 the same as what are used in 2D ResNet. This default setting renders the FLOPs distribution of 3×3×3 over 1×1×1 in ResNeXt-3D is 2.9%. This means about 3% of the model computation is spent on 3×3×3 depthwise convolution while the other 97% of computation is for 1×1×1 pointwise convolution. In particular embodiments, the social-networking system 160 may determine a number of the plurality of first filters based on the requirement of the trade-off between accuracy and computational cost. The social-networking system 160 may also determine a number of the plurality of second filters based on the requirement of the trade-off between accuracy and computational cost. These architecture hyper-parameters of N and M are adjusted such that there is different distribution of convolution type while keeping a similar FLOPs with the reference model.

Result. Table 3 presents the clip top-1 and video top-1 accuracy of different ResNeXt3D-50 variants on Kinetics validation set. ResNeXt3D-50 with 5% FLOPs of 3×3×3 convolution gives the best accuracy. Reducing the computation of 3×3×3 convolution from 2.9% to 1.5% results in 5% drop in video accuracy. Increasing the 3×3×3 convolution FLOPs to 5% gives about 1% improvement in accuracy. Going beyond 5%, accuracy starts to degrade.

TABLE 3

Varying the distribution of convolution type on ResNeXt. (R) is marked for the reference model.

| Model | M | N | $3^3$ conv. (%) | clip @ 1 acc. (%) | video @ 1 acc. (%) | FLOPs ×$10^9$ | Parameters ×$10^6$ |
|---|---|---|---|---|---|---|---|
| ResNeXt-3D | 20 | 505 | 1.5 | 47.1 | 59.4 | 8.4 | 18.4 |
| ResNeXt-3D (R) | 64 | 256 | 2.9 | 52.7 | 64.4 | 8.4 | 13.1 |
| ResNeXt-3D | 118 | 143 | 5 | 53.4 | 65.3 | 8.3 | 11.5 |
| ResNeXt-3D | 246 | 65 | 10 | 52.4 | 64.9 | 8.2 | 10.3 |

In the following, some previous observations are collectively chosen, and one architecture of ResNeXt-3D is trained and compared with state-of-the-art methods on different public action recognition benchmarks. The ResNeXt-3D with 101 layers with the filter setting (M=118, N=143) is used such that the computation ratio between 3×3×3 over 1×1×1 is about 5%.

Datasets. The ResNeXt-3D is evaluated on various public benchmarks including Sports1M [20], Kinetics [37] (version 1 with 400 action categories), Something-Something [40], UCF101 [41], and HMDB51 [42]. For Sports1M, the public train and test splits provided with the dataset are used. For Kinetics and Something-Something, the train split is used for training and the validation set is used for testing. For UCF101 and HMDB51, the public 3-splits and the standard 3-fold cross validation are used for evaluation.

Training and testing. Different from the previous ablation experiments, this model is trained with 32-frame clip inputs (T=32) and evaluated with densely sampled clips from each testing video (e.g., clips with T-1 frames overlapped). Only one center crop is used per clip. Video-level prediction is averaged from the center crop predictions of these clips.

TABLE 4

Comparisons with state-of-the-art architectures on Kinetics.

| Method | top-1 accuracy (%) | top-5 accuracy (%) | FLOPs ×10$^9$ | Parameters ×10$^6$ |
|---|---|---|---|---|
| I3D [5] | 67.5 | 87.2 | 107.9 | 12.1 |
| ARTNet(d) [28] | 69.2 | 88.3 | 23.5 | 35.2 |
| S3D [30] | 69.4 | 89.1 | 66.4 | 8.8 |
| R(2 + 1)D [12] | 72.0 | 90.0 | 152.4 | 63.6 |
| ResNeXt-3D | 72.9 | 90.4 | 48.0 | 22.1 |

Results. Table 4 presents the results of the ResNeXt-3D with 101 layers compared with current state-of-the-art methods on Kinetics validation set. For a fair comparison, it is only compared with methods that are trained from scratch on RGB input as it is a fair comparison in term of architecture. On accuracy, ResNeXt3D with 101 layers outperforms I3D [5], ARTNet [28], and S3D [30] by 4.7%, 3%, and 2.8%, respectively and is on par with R(2+1)D. On computation, ResNeXt-3D is 3× faster than R(2+1)D, 2.2× faster than I3D, and 1.4× faster than S3D. It is noted that although ARTNet has 2× fewer FLOPs compared with the ResNeXt-3D, it uses 250 crops per one testing video while the ResNeXt-3D uses only about 115 crops per video which ends up with two models have similar inference time per testing video.

Table 5 reports results of ResNeXt-3D and compares it with state-of-the-art methods on Sports1M and Something-Something. On Sports1M, ResNeXt-3D outperforms most current methods by a good margin except R(2+1)D. ResNeXt-3D is still 0.5% lower than R(2+1)D in video top-1 accuracy, however it is 3× faster and 3× smaller compared with R(2+1)D. On Something-Something, ResNeXt-3D outperforms ECO-Net [46], non-local network+graph convolution network [45], non-local network [27], and M-TRN [43] by 1.5%, 1.8%, 3.5%, and 13.5%, respectively. It is noted that ResNeXt-3D is trained from scratch while the current methods are pre-trained on ImageNet.

TABLE 5

Comparisons with state-of-the-art architectures on Sports1M and Something-Something.

| | Sports1M | | | Something-Something | |
|---|---|---|---|---|---|
| Method | video @1 | video @5 | Method | video @1 | video @5 |
| C3D [4] | 61.1 | 85.2 | M-TRN [43] | 34.4 | 63.2 |
| Conv pool [44] | 71.7 | 90.4 | NL I3D [45] | 44.4 | 76.0 |
| P3D [29] | 66.4 | 87.4 | NL I3D + GCN [45] | 46.1 | 76.8 |
| R(2 + 1)D | 73.0 | 91.5 | ECO-Net [46] | 46.4 | — |
| ResNeXt-3D | 72.5 | 91.4 | ResNeXt-3D | 47.9 | 76.9 |

Transferring to small benchmarks. The embodiments disclosed herein also evaluate how well the representation learned by ResNeXt-3D with 101 layers can be transferred to other smaller benchmarks, such as UCF101 and HMDB51. Table 6 presents the accuracy of ResNeXt-3D on UCF101 and HMDB51 and compares with state-of-the-art methods. The upper part of the table are methods using both RGB and optical flows as input, while the lower part of the table presents methods using only RGB input and pre-trained only on Kinetics. It is noted that the results on the upper part of the table are not directly comparable to the results of ResNeXt-3D as they are pre-trained on different datasets and using different inputs (normally with both RGB and optical flows). The lower part of the table, however, presents fairly comparable results where all methods are pre-trained on Kinetics and using only RGB as inputs. ResNeXt-3D with 101 layers is on par with I3D and R(2+1)D on the transferring tasks, while it is 3× and 2.2× faster (c.f. FLOPs comparison in Table 4) than R(2+1)D and I3D, respectively. On model size, while being 3× smaller than R(2+1)D, ResNeXt-3D is still about 2× and 3× bigger than I3D and S3D, respectively.

TABLE 6

Comparisons with state-of-the-art methods on UCF101 and HMDB51.

| Method | pretraining dataset | UCF101 | HMDB51 |
|---|---|---|---|
| Two-Stream [21] | ImageNet | 88.0 | 59.4 |
| Action Transf. [24] | ImageNet | 92.4 | 62.0 |
| Spatiotemp. ResNet [22] | ImageNet | 93.4 | 66.4 |
| Temp. Segm. Net [23] | ImageNet | 94.2 | 69.4 |
| I3D-RGB [5] | Kinetics | 95.1 | 74.3 |
| ARTNet-RGB [28] | Kinetics | 93.5 | 67.6 |
| R(2 + 1)D-RGB [12] | Kinetics | 96.8 | 74.5 |
| ResNeXt-3D-RGB | Kinetics | 95.9 | 72.7 |

In Table 6, upper table presents methods using both RGB and optical flows as inputs with different pre-training datasets. Lower table presents methods that use only RGB input and pre-trained on Kinetics. It is worth noting that random chances are about 1% and 2% on UCF101 and HMDB51, respectively.

The embodiments disclosed herein have presented a comprehensive evaluation of different popular image architectures on the video classification problem with the main interest of understanding 3D groupwise convolutions. The comprehensive experiments tried to address (if not fully) in multiple ways the questions: 1) Is 3D groupwise convolution useful for reducing the computational cost of video models? 2) When shifting from the image to the video domain, can the trade-offs among different groupwise convolutional architectures still hold? and 3) If the trade-offs are different from image to video, what are the best practices of applying 3D groupwise convolution to video classification? First, the embodiments disclosed herein showed that 3D groupwise convolution may help to significantly reduce the computation of video models without dropping accuracy. Second, some accuracy/computation trade-off between different families of models observed in image classification may be different for action recognition. Third, the analysis of the embodiments disclosed herein has also showed that the computation distribution over different types of convolution is correlated with the model efficiency (e.g., accuracy over computation). This observation is still far from any conclusive statements/guidelines about the architecture design. However, it is hoped that it may hint and motivate future research in this direction. Last but not least, the ablation study also results in a new state-of-the-art video architecture, namely ResNeXt-3D, which outperforms or on par with current best video architectures on Sports1M, Something-Something, Kinetics, UCF101, and HMDB51 while being 3× faster than current methods.

The following list of references correspond to the citations above:

[1] van den Oord, A., Dieleman, S., Zen, H., Simonyan, K., Vinyals, O., Graves, A., Kalchbrenner, N., Senior, A. W., Kavukcuoglu, K.: Wavenet: A generative model for raw audio. In: The 9th ISCA Speech Synthesis Workshop, Sunnyvale, Calif., USA, 13-15 Sep. 2016. (2016) 125.

[2] Gehring, J., Auli, M., Grangier, D., Yarats, D., Dauphin, Y. N.: Convolutional sequence to sequence learning. In: ICML. (2017) 1243-1252.

[3] Schwenk, H., Barrault, L., Conneau, A., LeCun, Y.: Very deep convolutional networks for text classification. In: EACL. (2017) 1107-1116.

[4] Tran, D., Bourdev, L., Fergus, R., Torresani, L., Paluri, M.: Learning spatiotem-poral features with 3d convolutional networks. In: ICCV. (2015).

[5] Carreira, J., Zisserman, A.: Quo vadis, action recognition? a new model and the kinetics dataset. In: CVPR. (2017).

[6] Hochreiter, S., Schmidhuber, J.: Long short-term memory. Neural computation 9(8) (1997) 1735-1780.

[7] Chollet, F.: Xception: Deep learning with depthwise separable convolutions. In: CVPR. (2017).

[8] Xie, S., Girshick, R., Dollar, P., Tu, Z., He, K.: Aggregated residual transformations for deep neural networks. In: CVPR. (2017).

[9] Howard, A. G., Zhu, M., Chen, B., Kalenichenko, D., Wang, W., Weyand, T., An-dreetto, M., Adam, H.: Mobilenets: Efficient convolutional neural networks for mobile vision applications. CoRR abs/1704.04861 (2017).

[10] Sandler, M., Howard, A. G., Zhu, M., Zhmoginov, A., Chen, L.: Inverted residuals and linear bottlenecks: Mobile networks for classification, detection and segmentation. CoRR abs/1801.04381 (2018).

[11] Zhang, X., Zhou, X., Lin, M., Sun, J.: Shufflenet: An extremely efficient convolutional neural network for mobile devices. CoRR abs/1707.01083 (2017).

[12] Tran, D., Wang, H., Torresani, L., Ray, J., LeCun, Y., Paluri, M.: A closer look at spatiotemporal convolutions for action recognition. In: CVPR. (2018).

[13] Szegedy, C., Liu, W., Jia, Y., Sermanet, P., Reed, S., Anguelov, D., Erhan, D., Vanhoucke, V., Rabinovich, A.: Going deeper with convolutions. In: CVPR. (2015).

[14] He, K., Zhang, X., Ren, S., Sun, J.: Deep residual learning for image recognition. In: CVPR. (2016).

[15] Laptev, I., Lindeberg, T.: Space-time interest points. In: ICCV. (2003).

[16] Dalal, N., Triggs, B., Schmid, C.: Human Detection Using Oriented Histograms of Flow and Appearance. In Leonardis, A., Bischof, H., Pinz, A., eds.: European Conference on Computer Vision (ECCV '06). Volume 3952 of Lecture Notes in Computer Science (LNCS)., Graz, Austria, Springer-Verlag (May 2006) 428-441.

[17] Dollar, P., Rabaud, V., Cottrell, G., Belongie, S.: Behavior recognition via sparse spatio-temporal features. In: Proc. ICCV VS-PETS. (2005).

[18] Sadanand, S., Corso, J.: Action bank: A high-level representation of activity in video. In: CVPR. (2012).

[19] Wang, H., Schmid, C.: Action recognition with improved trajectories. In: ICCV. (2013).

[20] Karpathy, A., Toderici, G., Shetty, S., Leung, T., Sukthankar, R., Fei-Fei, L.: Large-scale video classification with convolutional neural networks. In: CVPR. (2014).

[21] Simonyan, K., Zisserman, A.: Two-stream convolutional networks for action recognition in videos. In: NIPS. (2014).

[22] Feichtenhofer, C., Pinz, A., Wildes, R. P.: Spatiotemporal residual networks for video action recognition. In: NIPS. (2016).

[23] Wang, L., Xiong, Y., Wang, Z., Qiao, Y., Lin, D., Tang, X., Gool, L. V.: Temporal segment networks: Towards good practices for deep action recognition. In: ECCV. (2016).

[24] Wang, X., Farhadi, A., Gupta, A.: Actions ~transformations. In: CVPR. (2016).

[25] Feichtenhofer, C., Pinz, A., Zisserman, A.: Convolutional two-stream network fusion for video action recognition. In: CVPR. (2016).

[26] Deng, J., Dong, W., Socher, R., Li, L. J., Li, K., Fei-Fei, L.: Imagenet: A large-scale hierarchical image database. In: Computer Vision and Pattern Recognition, 2009. CVPR 2009. IEEE Conference on, IEEE (2009) 248-255.

[27] Wang, X., Girshick, R., Gupta, A., He, K.: Non-local neural networks. In: CVPR. (2018).

[28] Wang, L., Li, W., Li, W., Gool, L. V.: Appearance-and-relation networks for video classification. In: CVPR. (2018).

[29] Qiu, Z., Yao, T., Mei, T.: Learning spatio-temporal representation with pseudo-3d residual networks. In: ICCV. (2017).

[30] Xie, S., Sun, C., Huang, J., Tu, Z., Murphy, K.: Rethinking spatiotemporal feature learning for video understanding. CoRR abs/1712.04851 (2017).

[31] Chatfield, K., Lempitsky, V., Vedaldi, A., Zisserman, A.: The devil is in the details: an evaluation of recent feature encoding methods. In: BMVC. (2011).

[32] Chatfield, K., Simonyan, K., Vedaldi, A., Zisserman, A.: Return of the devil in the details: Delving deep into convolutional nets. In: BMVC. (2014).

[33] Wang, H., Ullah, M. M., Klaser, A., Laptev, I., Schmid, C.: Evaluation of local spatio-temporal features for action recognition. In: BMVC. (2009).

[34] Józefowicz, R., Zaremba, W., Sutskever, I.: An empirical exploration of recurrent network architectures. In: ICML. (2015) 2342-2350.

[35] Greff, K., Srivastava, R. K., Koutm'k, J., Steunebrink, B. R., Schmidhuber, J.: LSTM: A search space odyssey. IEEE Trans. Neural Netw. Learning Syst. 28(10) (2017) 2222-2232.

[36] Huang, J., Rathod, V., Sun, C., Zhu, M., Korattikara, A., Fathi, A., Fischer, I., Wojna, Z., Song, Y., Guadarrama, S., et al.: Speed/accuracy trade-offs for modern convolutional object detectors. In: IEEE CVPR. (2017).

[37] Kay, W., Carreira, J., Simonyan, K., Zhang, B., Hillier, C., Vijayanarasimhan, S., Viola, F., Green, T., Back, T., Natsev, P., Suleyman, M., Zisserman, A.: The kinetics human action video dataset. CoRR abs/1705.06950 (2017).

[38] Goyal, P., Dolla'r, P., Girshick, R., Noordhuis, P., Wesolowski, L., Kyrola, A., Tul-loch, A., Jia, Y., He, K.: Accurate, large minibatch sgd: training imagenet in 1 hour. arXiv preprint arXiv:1706.02677 (2017).

[39] Caffe2-Team: Caffe2: A new lightweight, modular, and scalable deep learning framework. https://caffe2.ai/.

[40] Goyal, R., Kahou, S. E., Michalski, V., Materzynska, J., Westphal, S., Kim, H., Haenel, V., Frund, I., Yianilos, P., Mueller-Freitag, M., Hoppe, F., Thurau, C., Bax, I., Memisevic, R.: The "something something" video database for learning and evaluating visual common sense. arXiv:1706.04261 (2017).

[41] Soomro, K., Zamir, A. R., Shah, M.: UCF101: A dataset of 101 human action classes from videos in the wild. In: CRCV-TR-12-01. (2012).

[42] Kuehne, H., Jhuang, H., Garrote, E., Poggio, T., Serre, T.: HMDB: a large video database for human motion recognition. In: ICCV. (2011).

[43] Zhou, B., Andonian, A., Torralba, A.: Temporal relational reasoning in videos. arXiv:1711.08496 (2017).

[44] Yue-Hei Ng, J., Hausknecht, M., Vijayanarasimhan, S., Vinyals, O., Monga, R., Toderici, G.: Beyond short snippets: Deep networks for video classification. In: Proceedings of the IEEE conference on computer vision and pattern recognition. (2015) 4694-4702.

[45] Wang, X., Gupta, A.: Videos as space-time region graphs. arXiv:1806.01810 (2018).

[46] Zolfaghari, M., Singh, K., Brox, T.: ECO: Efficient convolutional network for online video understanding. arXiv:1804.09066 (2018).

Figure 6:
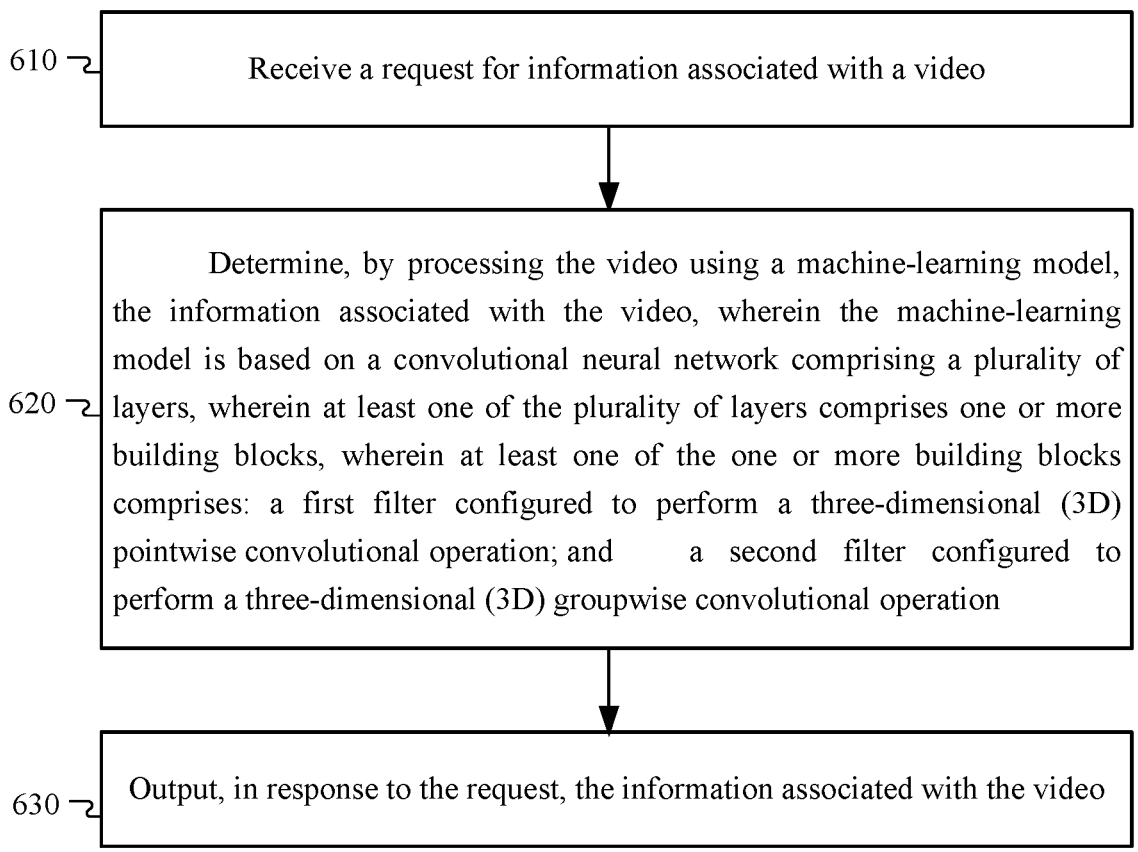
FIG. 6 illustrates an example method for determining information of a video.

FIG. 6 illustrates an example method 600 for determining information of a video. The method may begin at step 610, where the social-networking system 160 may receive a request for information associated with a video. At step 620, the social-networking system 160 may determine, by processing the video using a machine-learning model, the information associated with the video, wherein the machine-learning model is based on a convolutional neural network comprising a plurality of layers, wherein at least one of the plurality of layers comprises one or more building blocks, wherein at least one of the one or more building blocks comprises a first filter configured to perform a three-dimensional (3D) pointwise convolutional operation and a second filter configured to perform a three-dimensional (3D) groupwise convolutional operation. At step 630, the social-networking system 160 may output, in response to the request, the information associated with the video. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining information of a video including the particular steps of the method of FIG. 6, this disclosure contemplates any suitable method for determining information of a video including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
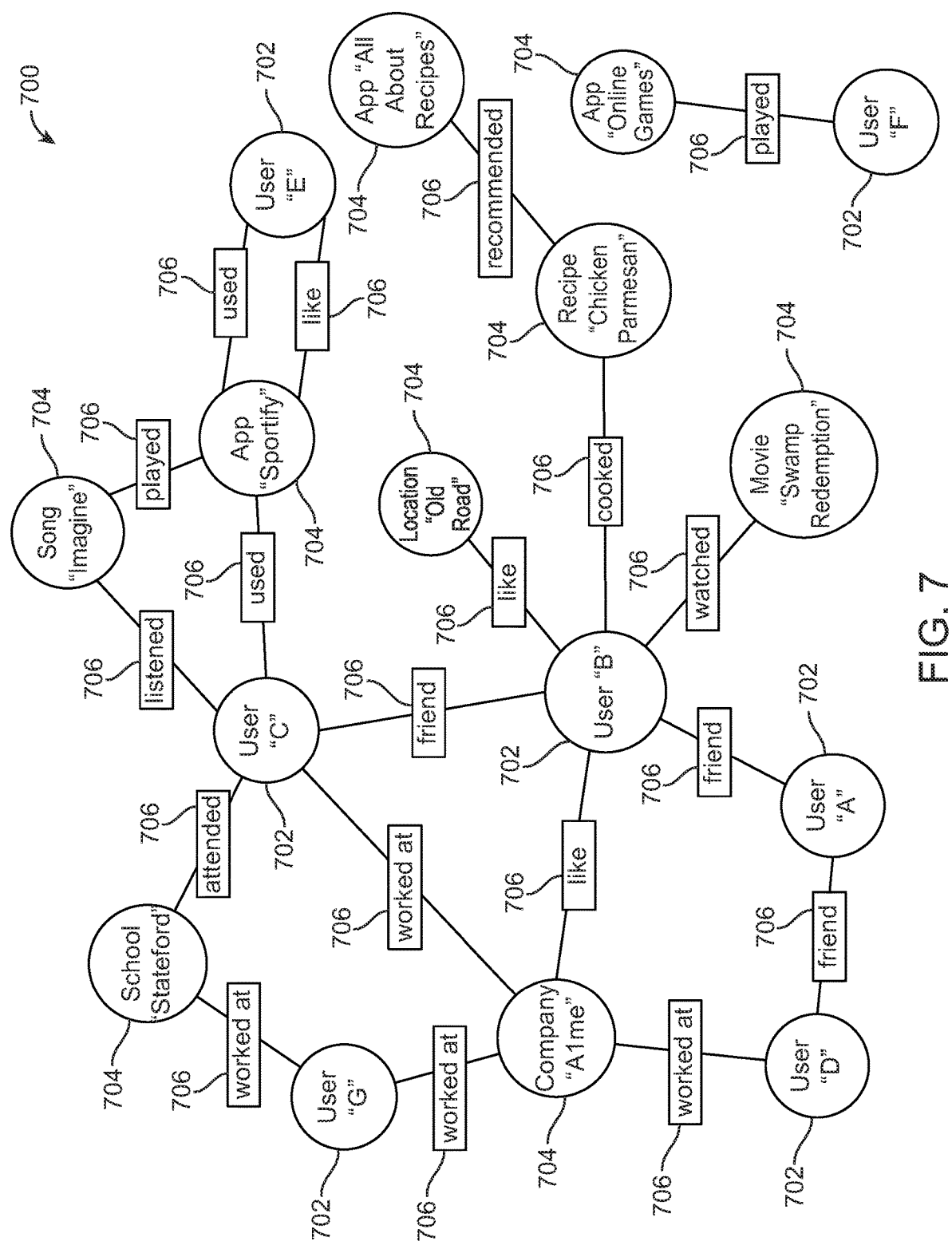
FIG. 7 illustrates an example social graph.

FIG. 7 illustrates an example social graph 700. In particular embodiments, the social-networking system 160 may store one or more social graphs 700 in one or more data stores. In particular embodiments, the social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. The example social graph 700 illustrated in FIG. 7 is shown, for didactic purposes, in a two-dimensional visual map representation. In particular embodiments, a social-networking system 160, a client system 130, or a third-party system 170 may access the social graph 700 and related social-graph information for suitable applications. The nodes and edges of the social graph 700 may be stored as data objects, for example, in a data store (such as a social-graph database). Such a data store may include one or more searchable or queryable indexes of nodes or edges of the social graph 700.

In particular embodiments, a user node 702 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with the social-networking system 160. In particular embodiments, a user node 702 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more web interfaces.

In particular embodiments, a concept node 704 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more web interfaces.

In particular embodiments, a node in the social graph 700 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 704. Profile interfaces may be viewable by all or a selected subset of other users. As an example and not by way of limitation, a user node 702 may have a corresponding user-profile interface in which the corresponding user may add content, make declarations, or otherwise express himself or herself. As another example and not by way of limitation, a concept node 704 may have a corresponding concept-profile interface in which one or more users may add content, make declarations, or express themselves, particularly in relation to the concept corresponding to concept node 704.

In particular embodiments, a concept node 704 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 702 corresponding to the user and a concept node 704 corresponding to the third-party web interface or resource and store edge 706 in one or more data stores.

In particular embodiments, a pair of nodes in the social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 706 connecting the first user's user node 702 to the second user's user node 702 in the social graph 700 and store edge 706 as social-graph information in one or more of data stores 164. In the example of FIG. 7, the social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile interface corresponding to a concept node 704 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, the social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704).

In particular embodiments, the social-networking system 160 may create an edge 706 between a user node 702 and a concept node 704 in the social graph 700. As an example and not by way of limitation, a user viewing a concept-profile interface (such as, for example, by using a web browser or a special-purpose application hosted by the user's client system 130) may indicate that he or she likes the concept represented by the concept node 704 by clicking or selecting a "Like" icon, which may cause the user's client system 130 to send to the social-networking system 160 a message indicating the user's liking of the concept associated with the concept-profile interface. In response to the message, the social-networking system 160 may create an edge 706 between user node 702 associated with the user and concept node 704, as illustrated by "like" edge 706 between the user and concept node 704. In particular embodiments, the social-networking system 160 may store an edge 706 in one or more data stores. In particular embodiments, an edge 706 may be automatically formed by the social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Figure 8:
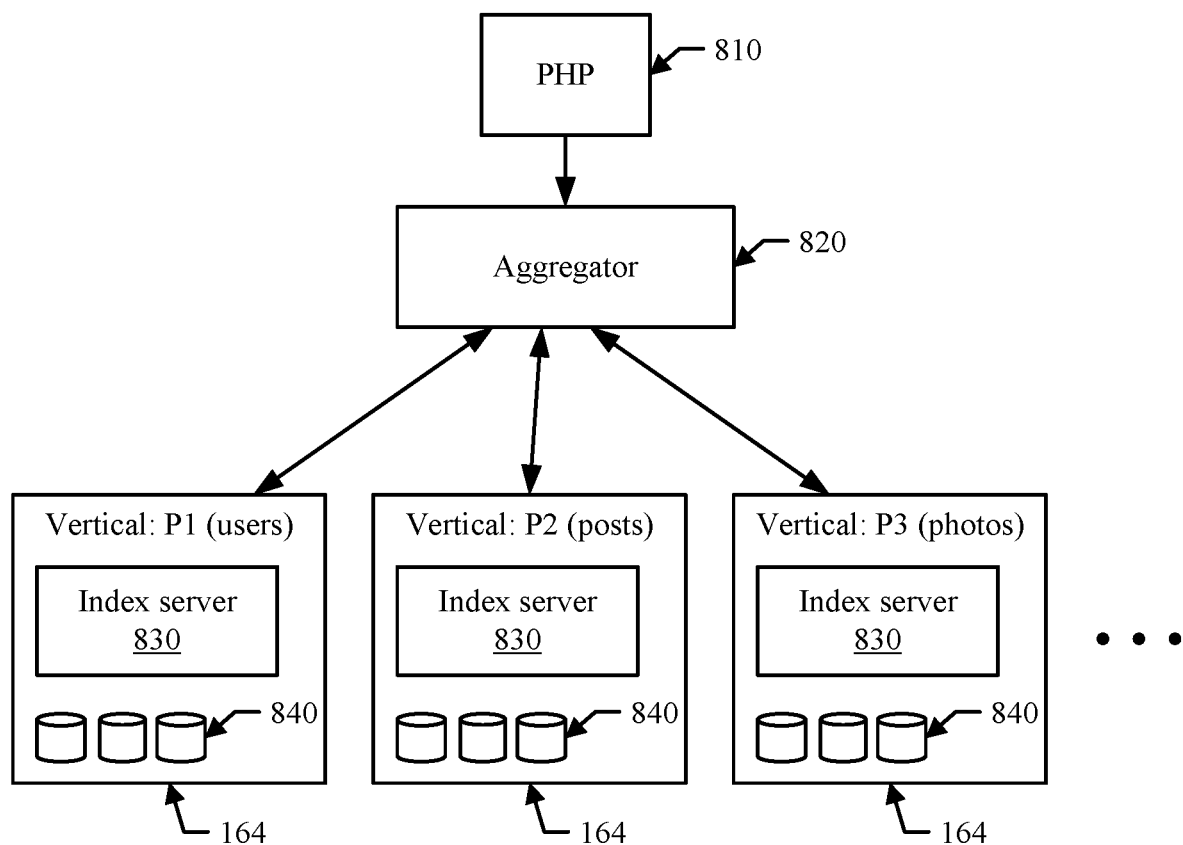
FIG. 8 illustrates an example partitioning for storing objects of a social-networking system.

FIG. 8 illustrates an example partitioning for storing objects of a social-networking system 160. A plurality of data stores 164 (which may also be called "verticals") may store objects of social-networking system 160. The amount of data (e.g., data for a social graph 700) stored in the data stores may be very large. As an example and not by way of limitation, a social graph can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 700. An edge 706 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 840. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 8 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 8 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 840.

In particular embodiments, objects stored in each vertical 164 may be indexed by one or more search indices. The search indices may be hosted by respective index server 830 comprising one or more computing devices (e.g., servers).

The index server 830 may update the search indices based on data (e.g., a photo and information associated with a photo) submitted to social-networking system 160 by users or other processes of social-networking system 160 (or a third-party system). The index server 830 may also update the search indices periodically (e.g., every 24 hours). The index server 830 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 810. The PHP process 810 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 820 may be configured to receive the search query from PHP process 810 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 8. Each of the verticals 164 may be configured to store a single type of object indexed by a search index as described earlier. In particular embodiments, the aggregator 820 may receive a search request. For example, the aggregator 820 may receive a search request from a PHP process 810. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 820 may determine one or more search queries based on the received search request. In particular embodiments, each of the search queries may have a single object type for its expected results (i.e., a single result-type). In particular embodiments, the aggregator 820 may, for each of the search queries, access and retrieve search query results from at least one of the verticals 164, wherein the at least one vertical 164 is configured to store objects of the object type of the search query (i.e., the result-type of the search query). In particular embodiments, the aggregator 820 may aggregate search query results of the respective search queries. For example, the aggregator 820 may submit a search query to a particular vertical and access index server 830 of the vertical, causing index server 830 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Figure 9:
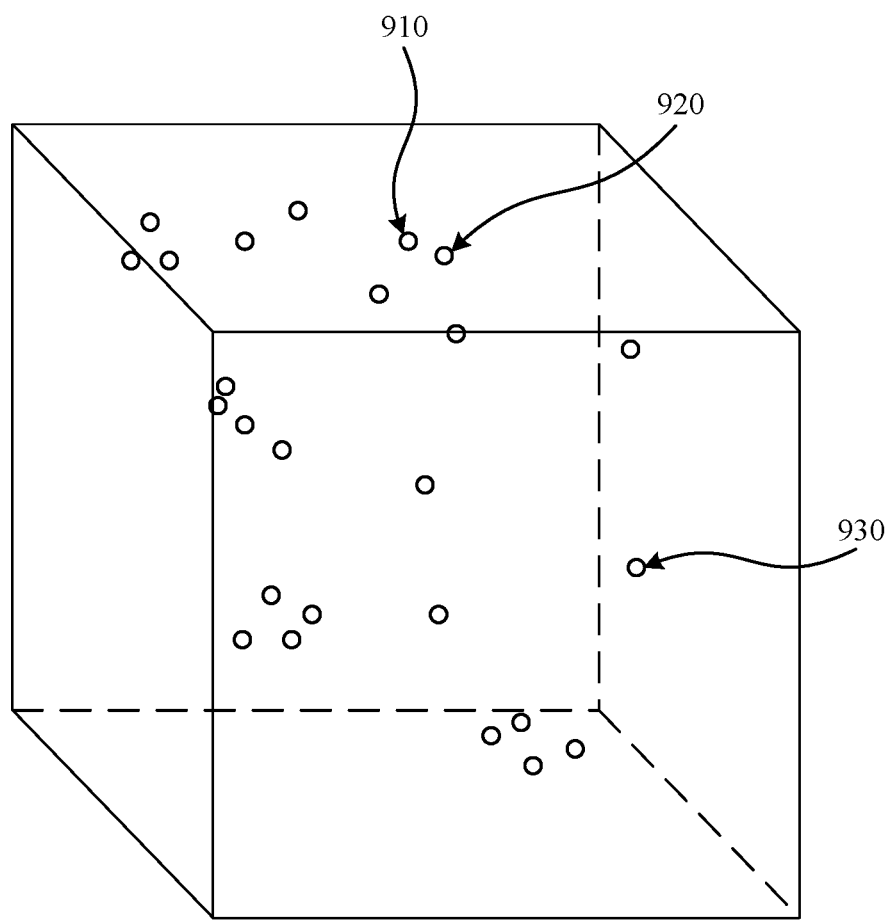
FIG. 9 illustrates an example view of an embedding space.

FIG. 9 illustrates an example view of a vector space 900. In particular embodiments, an object or an n-gram may be represented in a d-dimensional vector space, where d denotes any suitable number of dimensions. Although the vector space 900 is illustrated as a three-dimensional space, this is for illustrative purposes only, as the vector space 900 may be of any suitable dimension. In particular embodiments, an n-gram may be represented in the vector space 900 as a vector referred to as a term embedding. Each vector may comprise coordinates corresponding to a particular point in the vector space 900 (i.e., the terminal point of the vector). As an example and not by way of limitation, vectors 910, 920, and 930 may be represented as points in the vector space 900, as illustrated in FIG. 9. An n-gram may be mapped to a respective vector representation. As an example and not by way of limitation, n-grams $t_1$ and $t_2$ may be mapped to vectors $\vec{v_1}$ and $\vec{v_2}$ in the vector space 900, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 900. In particular embodiments, an n-gram may be mapped to a vector representation in the vector space 900 by using a machine leaning model (e.g., a neural network). The machine learning model may have been trained using a sequence of training data (e.g., a corpus of objects each comprising n-grams).

In particular embodiments, an object may be represented in the vector space 900 as a vector referred to as a feature vector or an object embedding. As an example and not by way of limitation, objects $e_1$ and $e_2$ may be mapped to vectors $\vec{v_1}$ and $\vec{v_2}$ in the vector space 900, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 900. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 900. As an example and not by way of limitation, vector 910 and vector 920 may correspond to objects that are more similar to one another than the objects corresponding to vector 910 and vector 930, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Figure 10:
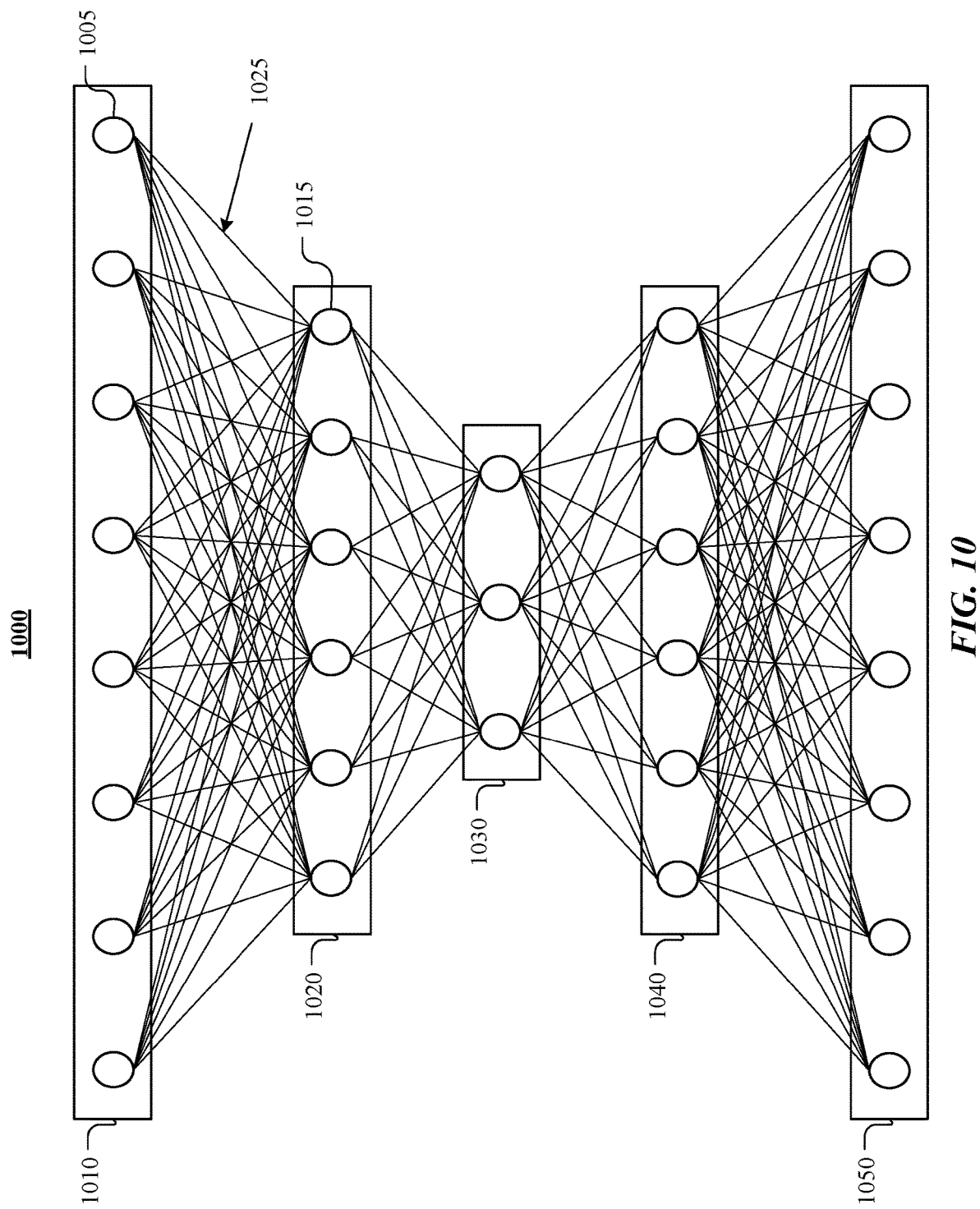
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1040, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one of more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1040. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(S_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof.

The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 700, the social-networking system 160 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Figure 11:
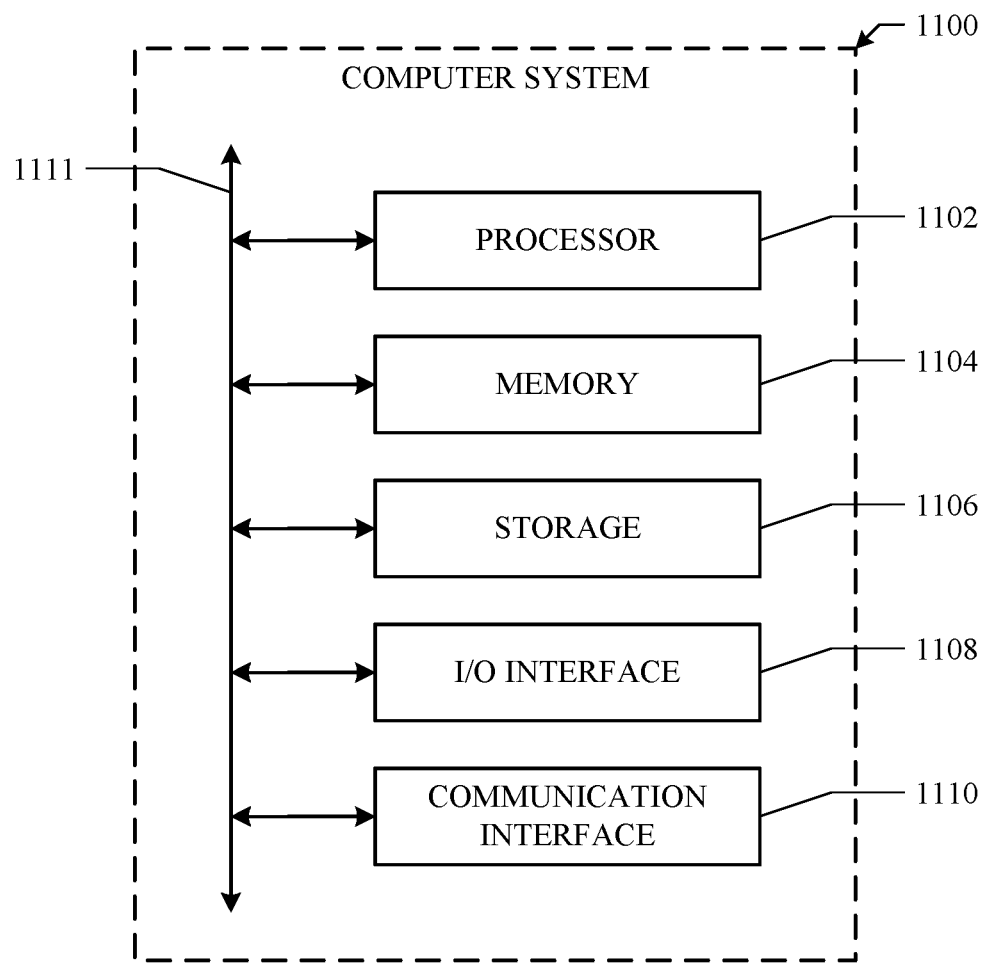
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving a request for information associated with a video;
   determining, by processing the video using a machine-learning model, the information associated with the video, wherein the machine-learning model is based on a convolutional neural network comprising a plurality of layers, wherein at least one of the plurality of layers comprises one or more building blocks, wherein at least one of the one or more building blocks comprises:
      a first filter configured to perform a three-dimensional (3D) pointwise convolutional operation on an input to the first filter;
      a second filter configured to perform a three-dimensional (3D) groupwise convolutional operation on an input to the second filter, wherein the input to the second filter comprises an output from the first filter; and
      a third filter configured to perform a three-dimensional (3D) pointwise convolutional operation on an input to the third filter, wherein the input to the third filter comprises an output from the second filter; and
   outputting, in response to the request, the information associated with the video.

2. The method of claim 1, wherein the information associated with the video comprises one or more of:
   a category associated with the video;
   a detection result associated with the video; or
   a segmentation result associated with the video.

3. The method of claim 1, wherein the video is associated with one or more channels.

4. The method of claim 3, wherein the 3D groupwise convolutional operation is associated with a process comprising:
   determining one or more groups for the one or more channels, wherein each group comprises one or more of the one or more channels; and
   applying a convolutional operation to each of the one or more groups separately.

5. The method of claim 3, wherein the 3D groupwise convolutional operation comprises a 3D depthwise convolutional operation.

6. The method of claim 5, wherein the 3D depthwise convolutional operation is associated with one or more input channels and one or more output channels, and wherein a number of the one or more input channels equals a number of the one or more output channels.

7. The method of claim 5, wherein the 3D depthwise convolutional operation is associated with a process comprising:
   determining one or more groups for the one or more channels, wherein each group comprises one channel of the one or more channels; and
   applying a convolutional operation to each of the one or more groups separately.

8. The method of claim 1, wherein the convolutional neural network further comprises a plurality of paddings, kernels, and stridings.

9. The method of claim 1, wherein the convolutional neural network is based on a 3D network architecture.

10. The method of claim 1, further comprising:
    training the machine-learning model based on a plurality of training videos.

11. The method of claim 1, wherein the request is associated with a requirement of a trade-off between accuracy and computational cost.

12. The method of claim 11, further comprising:
    determining a number of the plurality of layers based on the requirement of the trade-off between accuracy and computational cost.

13. The method of claim 11, wherein the at least one building block comprises a plurality of first filters and a plurality of second filters.

14. The method of claim 13, further comprising:
    determining a number of the plurality of first filters based on the requirement of the trade-off between accuracy and computational cost.

15. The method of claim 13, further comprising:
    determining a number of the plurality of second filters based on the requirement of the trade-off between accuracy and computational cost.

16. One or more computer-readable non-transitory storage media embodying software that is operable when executed to:
    receive a request for information associated with a video;
    determine, by processing the video using a machine-learning model, the information associated with the video, wherein the machine-learning model is based on a convolutional neural network comprising a plurality of layers, wherein at least one of the plurality of layers comprises one or more building blocks, wherein at least one of the one or more building blocks comprises:
      a first filter configured to perform a three-dimensional (3D) pointwise convolutional operation on an input to the first filter;
      a second filter configured to perform a three-dimensional (3D) groupwise convolutional operation on an input to the second filter, wherein the input to the second filter comprises an output from the first filter; and
      a third filter configured to perform a three-dimensional (3D) pointwise convolutional operation on an input to the third filter, wherein the input to the third filter comprises an output from the second filter; and
    output, in response to the request, the information associated with the video.

17. A system comprising: one or more processors; and a non-transitory memory coupled to the processors comprising instructions executable by the processors, the processors operable when executing the instructions to:
    receive a request for information associated with a video;
    determine, by processing the video using a machine-learning model, the information associated with the video, wherein the machine-learning model is based on a convolutional neural network comprising a plurality of layers, wherein at least one of the plurality of layers comprises one or more building blocks, wherein at least one of the one or more building blocks comprises:
      a first filter configured to perform a three-dimensional (3D) pointwise convolutional operation on an input to the first filter;
      a second filter configured to perform a three-dimensional (3D) groupwise convolutional operation on an input to the second filter, wherein the input to the second filter comprises an output from the first filter; and
      a third filter configured to perform a three-dimensional (3D) pointwise convolutional operation on an input to the third filter, wherein the input to the third filter comprises an output from the second filter; and
    output, in response to the request, the information associated with the video.

* * * * *